United States Patent [19]

Gryctko

[11] 4,301,491

[45] Nov. 17, 1981

[54] COMBINED FAULT CURRENT AND APPLIED VOLTAGE TRIPPING FOR SOLID STATE TRIP CIRCUIT AND PARTICULAR CURRENT TRANSFORMER CONSTRUCTION

[75] Inventor: Carl E. Gryctko, Cherry Hill, N.J.

[73] Assignee: Gould Inc., Rolling Meadows, Ill.

[21] Appl. No.: 113,944

[22] Filed: Jan. 21, 1980

[51] Int. Cl.³ .............................................. H02H 3/08
[52] U.S. Cl. ..................................... 361/93; 336/174; 340/664; 361/94; 361/98
[58] Field of Search ...................... 361/30, 31, 44–48, 361/87, 93, 94; 336/172–174; 340/664

[56] References Cited

U.S. PATENT DOCUMENTS

| 2,165,848 | 7/1939 | Gothe et al. ................... 361/93 X |
| 3,976,918 | 8/1976 | Clark ............................... 361/45 |
| 4,152,744 | 5/1979 | Pang ................................. 361/94 |

Primary Examiner—Harry E. Moose, Jr.

Attorney, Agent, or Firm—Bernard Gerb; Jerome M. Berliner; Harold Huberfeld

[57] ABSTRACT

A solid state trip circuit is disclosed which uses a shunt path saturable transformer comprised of a current transformer having a relatively high resistance shunt which serves to apply input voltage to the transformer primary winding. The larger the input current the higher the voltage drop across the shunt and the more quickly the transformer iron will become saturated. The saturation time during each half cycle then produces a measure of the current flow in the primary line. The output of the secondary winding of the transformer as well as a direct but resistive connection from the input circuit lines are applied to a solid state trip circuit which operates a circuit breaker trip latch. Energy for tripping at lower overload current is derived directly from the applied voltage from the line. At high overload conditions however, direct tripping occurs through energy derived from the transformer rather than directly from the line voltage.

9 Claims, 6 Drawing Figures

COMBINED FAULT CURRENT AND APPLIED VOLTAGE TRIPPING FOR SOLID STATE TRIP CIRCUIT AND PARTICULAR CURRENT TRANSFORMER CONSTRUCTION

BACKGROUND OF THE INVENTION

This invention relates to solid state trip circuits for circuit breakers and more particularly relates to a novel saturable transformer structure and solid state trip circuit in which tripping at high overload is derived from the fault current whereas a direct connection from the line voltage to the trip circuit controls relatively low overload tripping.

Circuit breakers containing solid state trip circuits which imitate the behavior of conventional thermal magnetic trip units for circuit breakers are well known and are disclosed, for example, in U.S. Pat. No. 4,064,469 and in the references described therein. The line current in such circuits is normally monitored by a current transformer. Current transformers used to date have been relatively large to avoid distortion of the line current and to insure linearity which might be lost due to the saturation of the transformer. Other circuits have been devised to permit a saturating transformer to be used with solid state trip circuits, but these have distorted the waveform of the primary bus and have been relatively large. Moreover, it is frequently required that two transformers be used, one for deriving control power to be used to power the entire solid state trip unit, while the other is used to derive a measure of the primary current which is used to operate the sensing and timing circuits of the solid state trip unit.

BRIEF DESCRIPTION OF THE INVENTION

In accordance with the invention the input to a solid state trip unit from the line being monitored includes a direct resistive connection and a connection from a novel modified current transformer. The direct connection is used as an input for relativey low magnitude overload whereas the transformer input is used in relatively high magnitude overloads.

The transformer is a relatively small current transformer having a single turn primary winding with a shunt conductor around the primary winding which has a relatively high resistance compared to the primary winding. When high current, for example, 800 amperes, flows in the primary bus and before the transformer iron saturates, most of the current will flow through the relatively high resistant shunt path. Once the voltage drop across the shunt is sufficiently high to saturate the transformer, current will then flow through the primary bus and primary winding of the current transformer. A relatively small shunt wire should be used for a large voltage drop. In operation, the larger the primary current the higher the voltage drop across the shunt. As a result, a larger number of volt-seconds applied to the transformer primary winding will cause the transformer to saturate in a shorter period. A point at which the current transformer saturates may then be monitored and output signals can be produced which are representative of the primary current as a function of the point at which the transformer is saturated. Significantly, the output will be present at high overload values, when the line voltage might have collapsed.

The saturable transformer described above will have a basically simple construction and will be a transformer having a single primary turn and conventional secondary winding. A relatively high resistant shunt wire is then connected in parallel with the primary winding and will have a simple and inexpensive configuration.

The novel transformer may then be applied to a trip circuit in such a manner that the transformer secondary outputs are connected to two single phase full wave bridges and at the same time a direct resistive connection is made from the input voltage lines to the bridge inputs. As a result, the output of the transformer is used through the solid state trip circuit to cause timed tripping of the circuit breaker under relatively high fault current conditions and when the line voltage might have collapsed. Under low overload conditions however, tripping is obtained through the direct resistive connection to the line voltage. Thus the transformer need only be used in a relatively small linear region of operation at the higher overload levels.

DETAILED DESCRIPTION OF THE DRAWINGS

Figure 1:
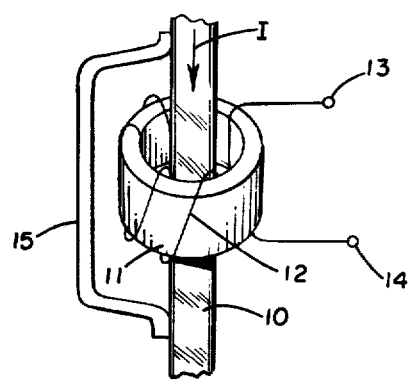
FIG. 1 schematically illustrates the novel transformer construction used for the saturable transformer of the present invention.
Figure 2:
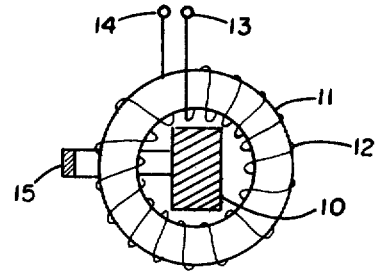
FIG. 2 is a cross-sectional view of the transformer of FIG. 1.

Referring first to FIGS. 1 and 2 there is shown therein a novel saturable transformer which can be applied to solid state trip circuits. In FIGS. 1 and 2 the main current path from the circuit breaker consists of the primary bus 10 which also acts as a single turn primary winding for the current transformer. The current transformer then has a magnetic core 11 of conventional construction surrounding the single turn primary 10 and a conventional multiturn secondary winding 12 having output terminals 13 and 14. The current transformer of FIGS. 1 and 2 can be economically manufactured using conventional manufacturing techniques.

In accordance with the invention and as shown in FIG. 1 a shunt wire 15 is connected in shunt with the primary winding 10. The shunt wire 15 is a relatively high resistance wire which, however, has sufficiently low resistance that the shunting of a considerable portion of the primary current therethrough will not cause it to heat excessively during operation. Its resistance however, should be greater than that of the primary bus 10 which serves as the primary winding for the current transformer. The shunt 15 may be connected to the primary 10 in any desired manner as by bolting, brazing or the like. The primary bus 11 can be a rectangular bus as best shown in FIG. 2 and the shunt 15 may be a self-supporting relatively low cross-section copper bar which holds the shape to which it is bent as schematically illustrated in FIG. 1.

Figure 3:
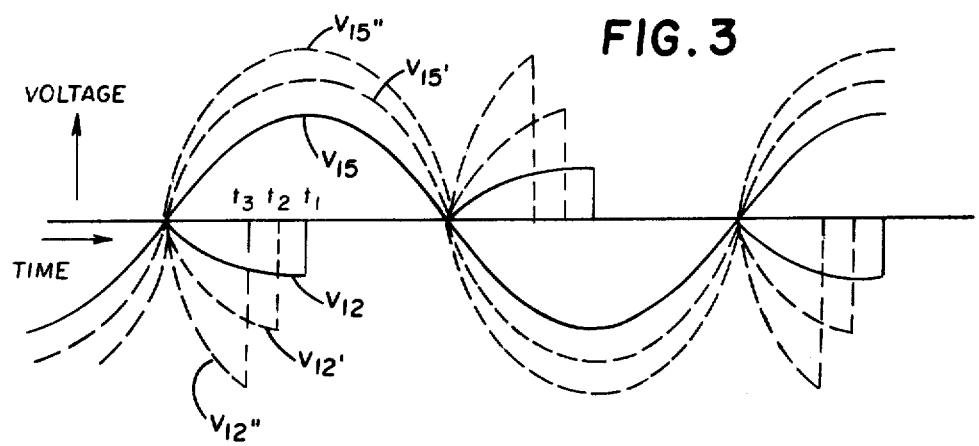
FIG. 3 shows the waveforms of the input voltage and output voltage of the transformer of FIGS. 1 and 2 for different input voltages across the shunt on the primary winding.

In operation and when the primary current I has a relatively low instantaneous value most of the current will flow through the shunt path 15. This will develop a voltage drop across the shunt path which will serve as an input primary voltage to what would normally be the current transformer of FIGS. 1 and 2. As the primary instantaneous current increases, the voltage drop on shunt 15 will increase until the volt second rating of the transformer is reached. The transformer iron core 11 will then saturate and current flow will commutate from the relatively high resistance path of shunt 15 through the main low resistance primary winding 10. It will be apparent that the larger the peak value is for the current I, the sooner the core 11 will saturate. Thus, as shown in FIG. 3 the voltage $V_{15}$ which is voltage across the shunt 15 is a sinusoidal voltage having a relatively low magnitude in solid line. This voltage will produce a relatively small voltage $V_{12}$ on the secondary winding. The core 10 saturates at the time $T_1$ when the voltage $V_{15}$ is applied in the solid line. When however the current I through the circuit breaker which is connected to the current transformer increases to the dotted line $V_{15'}$ and $V_{15''}$ the secondary voltage will increase to $V_{12'}$ and $V_{12''}$ respectively and the transformer core 11 will saturate at earlier times $T_2$ and $T_3$ respectively. It will be apparent from FIG. 3 that the magnitude of the current I can be measured by measuring the times $T_3$, $T_2$ or $T_1$ in order to produce a relatively high sensitivity measurement of the current in the primary winding 10.

This result is obtained with a saturable transformer of extremely simple and inexpensive construction. Moreover, the transformer produces a minimum disturbance in the primary current waveform and produces an easily measurable time variation of saturation characteristics to produce a good measure of the current magnitude in the current transformer primary winding. Moreover, the novel transformer is relatively small. Thus, in the above, a current transformer is described which is modified for use as a voltage transformer by a novel relatively high resistance shunt so that a single small transformer can be used to operate in a linear region and can supply both operating power and will sense the primary turn with high sensitivity.

In a typical transformer, which has been constructed and tested, the primary rated current was 800 amperes. The shunt 15 was such that at 800 amperes a voltage drop of about 75 millivolts was produced. The outer diameter of the transformer was about ⅞ inch, and the transformer had a measured transformer ratio of about 600 to 1. This voltage will increase linearly with increasing current.

The outputs measured as a function of varying the current through the primary thus varying the RMS voltage across shunt 15, was as follows.

| $V_{15}$ (RMS) | $V_{12}$ (RMS) |
|---|---|
| 3.2 mV | 1.27 V |
| 3.6 mV | 1.41 V |
| 6.9 mV | 2.12 V |
| 11.1 mV | 2.83 V |
| 23.8 mV | 4.25 V |

The above test demonstrates that a very small transformer can supply sufficient power and sensitivity to a solid state trip unit as will be described later. However, a novel circuit is provided whereby the output of the transformer is used only at relatively high overload values while a voltage, applied directly from the input lines is used to operate the relay at low overload current.

Figure 4A:
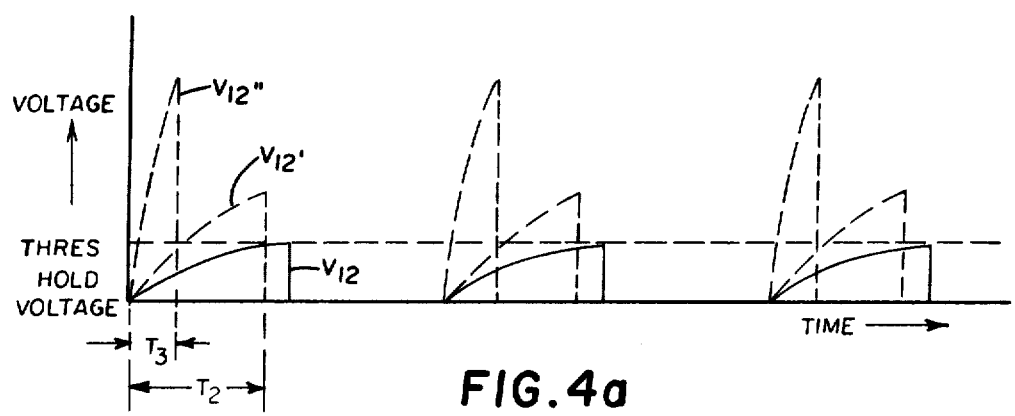
FIG. 4a shows the output voltages of FIG. 3 relative to a threshold voltage.
Figure 4:
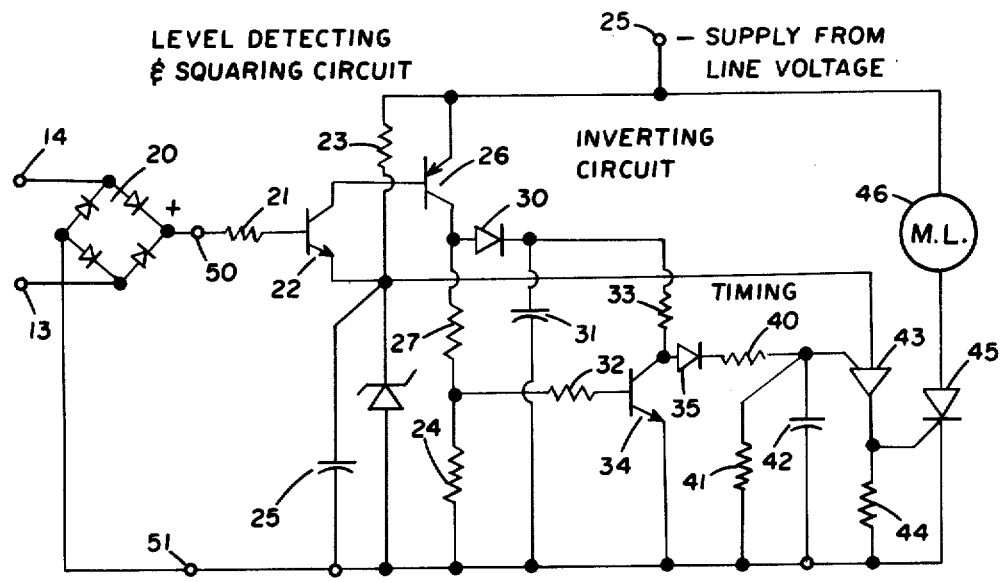
FIG. 4 is a circuit diagram of a circuit which can receive the output secondary voltage of the transformer of FIGS. 1 and 2 in order to operate the magnetic latch of a conventional circuit breaker.

FIG. 4 illustrates a novel solid state relay circuit which can use, as an input, the saturating current transformer of FIGS. 1 and 2. Thus, in FIG. 4, the voltage of the secondary winding 12 is applied to the terminals 13 and 14 which are the a-c terminals of a single phase full wave bridge connected rectifier 20. The positive output terminal of bridge 20 is connected to resistor 21 and transistor 22.

Transistor 22 is the input transistor of a level-detecting-and-squaring-circuit which consists of a first circuit including resistor 23 and zener diode 24 which are connected between a positive terminal 25a of a power supply which will be later described and the negative ground terminal of the bridge 20. A capacitor 25 is connected in parallel with zener diode 24. The circuit further includes a second transistor 26 having an emitter collector circuit in series with the voltage dividing resistors 27 and 28. The collector of transistor 22 is then connected to the base of transistor 26.

The power supply circuit may consist of a conventional bridge connected rectifier circuit which is connected to the line voltage (not shown) and then connected to a filter capacitor and then to the terminal 25a.

The level detecting and squaring circuit described to this point includes the transistors 22 and 26 which act in the manner of a modified Schmitt trigger. The voltage across the zener diode 24 plus the diode drop voltage of transistor 22 is the threshold voltage of the level detecting circuit. This threshold voltage is shown in FIG. 4a. Any input pulse which is below the threshold voltage will not turn on the circuit and there will be no voltage drop across resistors 27 or 28. FIG. 4a illustrates the voltage pulses $V_{12}$ which are beneath the threshold voltage of the circuit previously described and these will not trigger the circuit into operation. If however, the primary current in the current transformer is sufficiently high to produce voltage pulses having the magnitude $V_{12'}$ the level detecting circuit will turn on for a period $T_2$ each half cycle. Finally, if the waveform is the voltage pulse $V_{12''}$ then the level detecting circuit will turn on for the period $T_3$ every half cycle. Thus, it is seen that the turn-on period will be determined by the width of the incoming pulse derived from the current transformer of FIGS. 1 and 2.

The circuit previously described will produce a square output which is applied to an inverting circuit consisting of the transistor 26, resistors 27 and 28, the diode 30, capacitor 31, resistor 32, resistor 33 and transistor 34 and diode 35. Diode 35 passes an inverted pulse to a timing circuit to be later described. Before triggering of the level detector circuit, the voltages across resistors 27 and 28 are zero and the inverter circuit is inoperative since the circuit obtains its power supply from the resistors 27 and 28. However, when the voltage across resistors 27 and 28 goes high, the capacitor 31 will charge to the voltage across voltage divider resistors 27 and 28 while the voltage on resistor 28 will bias transistor 34. The output voltage applied to the diode 35 however, is zero since all current will flow through the transistor 34 to ground. When the voltages on resistors 27 and 28 are zero, transistor 34 will turn off and the output voltage to the diode 35 will be high and is the voltage across the capacitor 31. This voltage is then used to charge the timing capacitor which will be later described. The capacitor 31 is recharged every time the voltage on resistor 27 is high and will discharge to the timing capacitor every time the voltage on resistor 27 is zero. Therefore, the output voltage at diode 35 from the inverter circuit is high when the voltage on resistors 27 and 28 are zero and is zero when the voltages on resistors 27 and 28 are high. As a result of this operation, it will be understood that the shorter the incoming pulse width, the wider will be the timing pulse width.

The timing and firing circuit of FIG. 4 consists of a resistor 40, resistor 41, capacitor 42, a programmable unijunction transistor 43, resistor 44 and a controlled rectifier 45. The controlled rectifier 45 is connected in series with the source of power applied at terminal 25a and the magnetic latch 46, which is the magnetic latch of a conventional circuit breaker. The operation of the timing circuit is such that the timing capacitor 42 will store charge until it reaches the threshold voltage plus a diode voltage drop (the triggering voltage). When the voltage across capacitor 42 reaches the triggering voltage of the programmable unijunction transistor 43 the unijunction transistor 43 conducts and applies a gate input to the controlled rectifier 45 causing the controlled rectifier 45 to fire and thus apply a strong pulse current to the magnetic latch 46 to cause the operation of the latch and the opening of the circuit breaker with which it is associated. The instant at which the magnetic latch 46 is operated is a function of the level of the fault current and thus the pulse width which is applied to terminal 13 and 14 of FIG. 4. Thus the circuit operates in the manner of the conventional thermal-magnetic trip circuit of a conventional circuit breaker.

Figure 5:
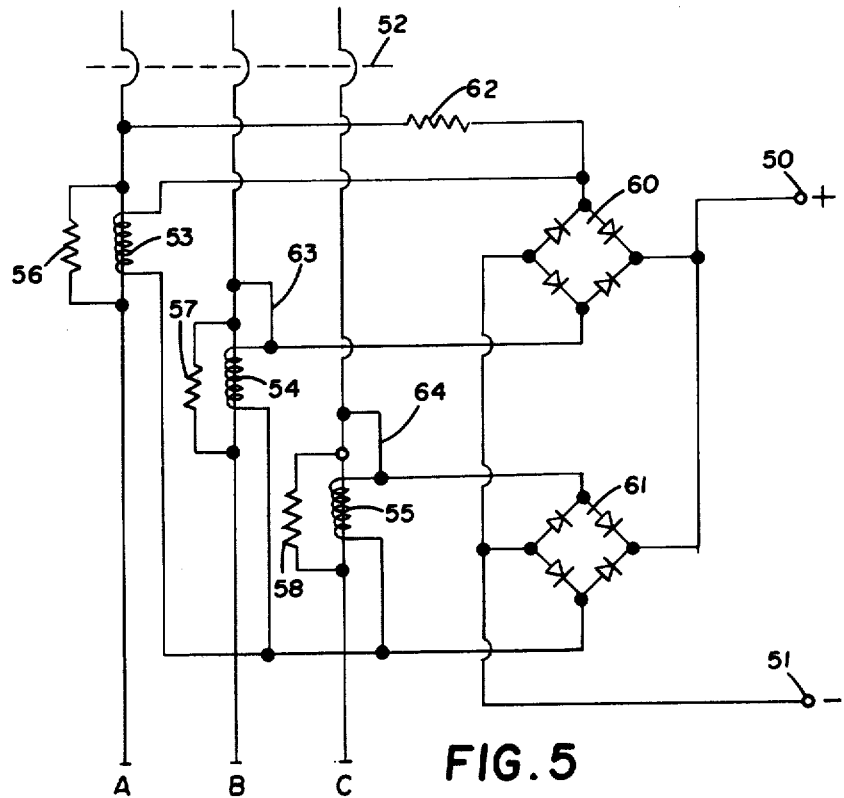
FIG. 5 shows the novel circuit of the invention utilizing the transformer of FIGS. 1 and 2 in combination with a direct resistive input connection to produce applied voltage tripping when connected to a solid state relay circuit of the type shown in FIG. 4.

FIG. 4 shows only the saturable transformer input to the solid state trip circuit. In accordance with the invention, the input circuit can be the circuit shown in FIG. 5, wherein the transformers provide input to the solid state trip unit at high overload values, which a direct voltage from the line provides low overload input to the solid state unit. In FIG. 5, the terminals 50 and 51 correspond to points 50 and 51, respectively, in FIG. 4 which are the input points to the solid state trip circuit. In FIG. 5 a current transformer of the type shown in FIGS. 1 and 2 is connected in each line A, B and C of a three phase circuit breaker 52. The three individual current transformers are schematically illustrated as the current transformers 54, 54 and 55 respectively which have schematically illustrated relatively high resistance shunts 56, 57 and 58 respectively. Two single phase bridge connected rectifiers 60 and 61 are then interconnected with the current transformers 53, 54 and 55 in the manner shown. Thus the circuit connection includes a direct connection from the lines A, B and C to the rectifier circuit. Thus, a first direct connection is made to one a-c input of rectifier 60 through the resistor 62. A direct connection is also made from phase B to the other a-c input of rectifier 60 by means of the shunt 63 in line B. Similarly a direct connection is made from line C through the shunt 64 to one a-c input of rectifier 61.

The manner in which the circuit of FIG. 5 operates in conjunction with the solid state trip circuit of FIG. 4 is as follows:

In the event of a lower overload condition, the energy for tripping the circuit is derived directly from the voltage which is applied to the solid state trip circuit through the direct connections of resistor 62 to phase A and the direct connection of lines B and C to the rectifiers 60 and 61. In the event of a high overload condition, the line voltage on lines A, B and C might drop so that direct tripping through the series resistors 62 may not take place. However, under high overloads, the current transformers 53, 54 and 55, operating through the solid state trip unit of FIG. 4, will function to provide the necessary accurately timed signals under the high overload condition.

From the above, it is seen that the circuit of FIG. 5 combines fault current and applied voltage tripping in a common circuit.

The voltage drops across shunts 56, 57 and 58 can be used to affect timing and triggering of a trip circuit using long-time and time-delay sensing. Circuits of this type will be apparent to those skilled in the art.

Although a preferred embodiment of this invention has been described, many variations and modifications will now be apparent to those skilled in the art, and it is therefore preferred that the instant invention be limited not by the specific disclosure herein, but only by the appending claims.

What is claimed is:

1. A trip circuit for a circuit breaker; said circuit breaker including a magnetic latch energizable to trip said circuit breaker; said trip circuit including a solid state trip circuit connected to said magnetic latch for operating said latch under given circuit breaker current conditions, and a sensing circuit coupled to the current through said circuit breaker and connected to said solid state relay circuit to provide input signals therefore related to the current flow through said circuit breaker; said sensing circuit including a saturable transformer producing output pulses having a length related to the magnitude of the current flow through said circuit breaker and a direct resistive connection to the lines connected to said circuit breaker whereby said direct resistive connection operates as the input to said solid state circuit under low overload conditions and said saturable transformer acts as the input to said solid state circuit under relatively high overload conditions.

2. The circuit of claim 1 wherein said saturable transformer comprises a magnetic core, a single turn primary winding extending through said core, a multi-turn secondary winding surrounding said core, and a shunt conductor connected in parallel with said single turn primary winding and disposed externally of said core; said shunt conductor having a resistance substantially higher than the resistance of said primary winding, whereby current flow through said parallel-connected shunt and primary winding, when said core is unsaturated, divides with a substantial portion of the current flowing through said shunt and with transformer magnetizing current flowing through said primary winding, and whereby substantially all current flow is through said primary winding after said core saturates; said secondary winding connected to said solid state trip circuit.

3. A saturable transformer comprising a magnetic core, a single turn primary winding extending through said core, a multi-turn secondary winding surrounding said core, and a shunt conductor connected in parallel with said single turn primary winding and disposed externally of said core; said shunt conductor having a resistance substantially higher than the resistance of said primary winding, whereby current flow through said parallel-connected shunt and primary winding, when said core is unsaturated, divides with a substantial portion of the current flowing through said shunt and with transformer magnetizing current flowing through said primary winding, and whereby substantially all current flow is through said primary winding after said core saturates.

4. The transformer of claim 3 wherein said secondary winding has an output voltage pulse which lasts for a time dependent upon the RMS magnitude of the current flow into said shunt and primary winding.

5. A saturable current transformer operable in a voltage transformer mode comprising, in combination: a pair of primary terminals, a magnetic core, a single turn primary winding connected at its opposite ends to said pair of primary terminals; said primary winding being encircled by said magnetic core; a secondary winding having a pair of output terminals and winding said magnetic core, and a shunt conductor connected between said primary terminals and bypassing said magnetic core; said shunt conductor having a resistance substantially higher than that of said primary winding, whereby current flow through said parallel-connected shunt and primary winding, when said core is unsaturated, divides with a substantial portion of the current flowing through said shunt and with transformer magnetizing current flowing through said primary winding, and whereby substantially all current flow is through said primary winding after said core saturates.

6. The transformer of claim 5 wherein said secondary winding has an output voltage pulse which lasts for a time dependent upon the RMS magnitude of the current flow into said shunt and primary winding.

7. A solid state trip circuit for a circuit breaker; said solid state trip circuit including switching means operable to trip the trip latch of said circuit breaker, signal generating means connected to said switching means for operating said switching means under predetermined current conditions for the current through said circuit breaker, and saturable transformer means having input primary terminals connected to said circuit breaker for sensing the current flow through said circuit breaker; said a saturable transformer comprising a magnetic core, a single turn primary winding extending through said core, a multi-turn secondary winding surrounding said core, and a shunt conductor connected in parallel with said single turn primary winding and disposed externally of said core; said shunt conductor having a resistance substantially higher than the resistance of said primary winding; said secondary winding connected to said signal generating means and producing a pulse train input to said signal generating means which is pulse-width modulated in accordance with the RMS current through said circuit breaker.

8. The circuit of claim 7 whereby current flow through said parallel-connected shunt and primary winding, when said core is unsaturated, divides with a substantial portion of the current flowing through said shunt and with transformer magnetizing current flowing through said primary winding, and whereby substantially all current flow is through said primary winding after said core saturates.

9. The circuit of claims 7 or 8 which further includes a direct resistive connection from said circuit breaker to said signal generating means for ultimately producing a tripping signal to said switching means under relatively low overload conditions; said transformer ultimately producing the tripping signal for said switching means under relatively high overload conditions.

* * * * *